C. W. REINOEHL & B. L. WEAVER.
RAILWAY FROG.
APPLICATION FILED JULY 20, 1908.
912,619.
Patented Feb. 16, 1909.
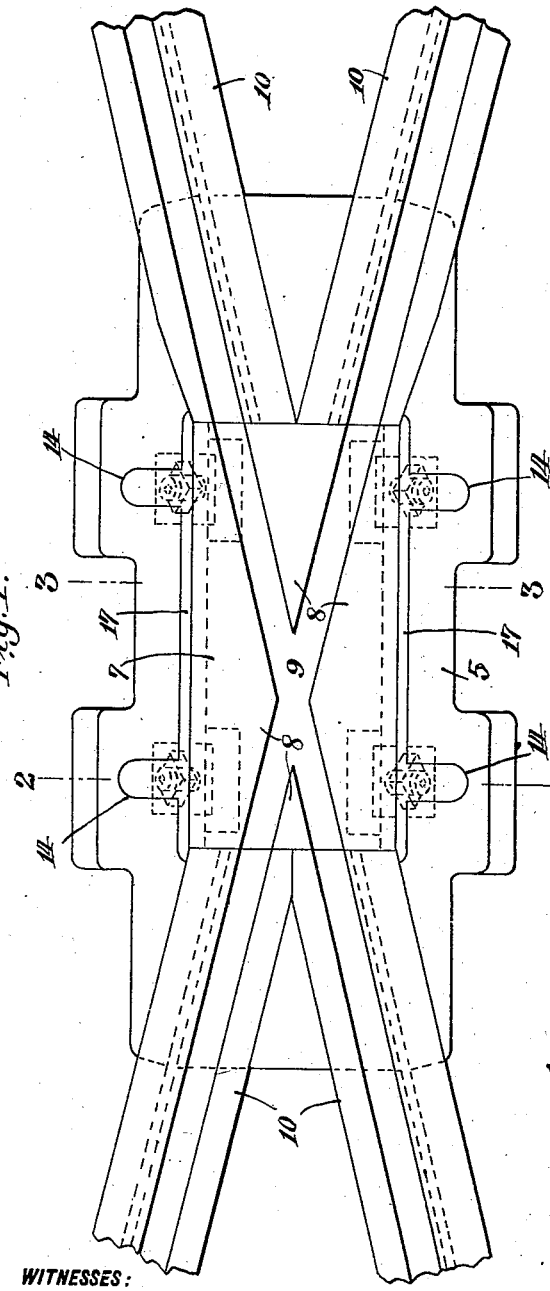
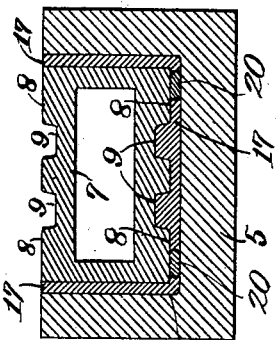
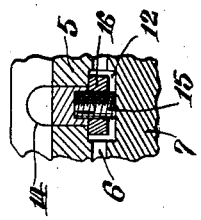
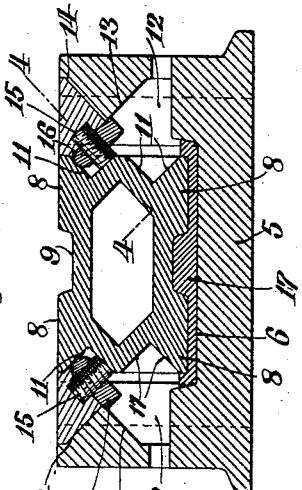
WITNESSES:
E. M. Ware
H. Gamble
INVENTORS
Charles W. Reinoehl
and Bent L. Weaver,
BY
Walter C. Pusey
ATTORNEY.

UNITED STATES PATENT OFFICE.

CHARLES W. REINOEHL AND BENT L. WEAVER, OF STEELTON, PENNSYLVANIA.

RAILWAY-FROG.

No. 912,619.

Specification of Letters Patent.

Patented Feb. 16, 1909.

Application filed July 20, 1908. Serial No. 444,531.

*To all whom it may concern:*

Be it known that we, CHARLES W. REINOEHL and BENT L. WEAVER, citizens of the United States, and residents of Steelton, Dauphin county, State of Pennsylvania, have invented certain new and useful Improvements in Railway-Frogs, of which the following is a full, clear, and exact description, reference being had to the accompanying drawings.

This invention relates to that class of railway crossings, frogs, or similar structures wherein a hard metal insert piece having a tread portion or portions, and a wheel flange-receiving groove or grooves, is seated in a recess in a supporting base and is removably secured therein, the tread portion or portions forming continuations of the tread portions of the rails leading to the frog.

The object of our invention is to provide a frog or similar structure having a supporting base provided with a recess and a reversible hard metal insert piece having upper and lower tread portions and upper and lower wheel flange-receiving grooves, together with means for securing the insert piece within the recess in the base so that the grooves and tread portions of either of its faces will come into proper relation to the tread portions of the rails leading to the crossing, as will be hereinafter fully described and claimed.

In the drawings:—Figure 1 is a plan view of a railroad frog or crossing embodying our invention. Fig. 2 is a transverse vertical section, as on the line 2—2, of Fig. 1. Fig. 3 is a transverse vertical section, as on the line 3—3 of Fig. 1. Fig. 4 is a detail in section, as on the line 4—4 of Fig. 2.

5 designates a base or casting in which is formed a recess 6. Within the recess 6 is a hard metal insert piece 7, forming the center or heart of the frog. The upper and lower faces of the insert piece form tread portions 8, to receive car wheels, and between the tread portions 8 are formed the flange-receiving grooves 9, through which the car wheel flanges pass.

Leading from each end of the base or casting 5, and secured thereto, are the railroad rails 10, the heads or tread portions of which are in line with the upper tread portions 8 of the hard metal insert piece 7, thus forming the intersecting tread portions and flange-ways for the frog or crossing, the upper face of the hard metal insert piece being in the same horizontal plane with the upper faces or tread portions of the rails 10, and forming continuations thereof.

The insert piece 7 rests upon the bottom of the recess 6, or upon spelter metal interposed between the bottom of the recess and the insert piece, as shown; and the insert piece is reversible in a manner to bring either of its faces uppermost into the same horizontal plane with the tops or tread portions of the rails 10. That is to say, the insert piece 7 may be removed from the recess 6, reversed or turned upside down, and then replaced within the recess so that the face of the insert piece previously resting upon the bottom of the recess 6 will be uppermost, and in the same horizontal plane with the tread portions of the rails 10. Thus it will be seen that should the tread portions of one face of the insert piece 7 become worn, said insert piece may be reversed to bring the tread portions of its other face into proper registry with the tread portions of the rails 10.

We shall now describe the means employed for detachably securing the insert piece 7 in position within the recess 6 with either face of the insert piece uppermost, and in line with the tread portions of the rails 10.

The side walls of the hard metal insert piece 7 are provided, near the four corners thereof with oppositely inclined faces 11, on an angle of about 45 degrees. The lower portions of the inner walls of the sides of the base 5 are provided with offset portions 12 adjacent the inclined faces 11. The offset portions 12 are open at their upper ends, and the upper wall 13 of each offset portion is at an angle of about 45 degrees and parallel to the adjacent, upper, inclined face 11 of the insert piece. Formed in the upper portion of the base 5, directly over each offset portion 12, is a concavity 14, the lower part of which communicates with the recess beneath the concavity. The transverse width of each cavity 14 is less than the transverse width of the offset portion 12, and when the hard metal insert piece 7 is in place, the side of each concavity 14 and the side of the wear piece form an opening leading into the upper portion of the offset portion 12 beneath the concavity.

Within each concavity 14 and having its inner and lower end engaged with the upper, adjacent, inclined face 11, is a screw 15 having a socketed upper end for the reception of a suitable tool by means of which the screw may be turned. The screw 15 is engaged with a nut 16, the upper and outer face of which is in engagement with the upper wall 13 of the adjacent offset portion 12.

In assembling the parts, we first drop the nuts 16 into the offset portions 12. We then place the hard metal insert piece 7 within the recess 6, with one of its faces in the same horizontal plane with the tread portions of the rails 10, and support the piece in this position, a slight distance above the bottom of the recess, by any suitable means; small pieces of lead between it and the base at certain points, for example. In this position of the insert piece, the inclined faces 11 thereof are adjacent the offset portions 12, and concavities 14 of the base. After the insert piece 7 has been placed within the recess 6, we draw the nuts 16, by means of a suitable device such as a piece of bent wire, up into position between the upper walls 13 of the offset portions 12 and the upper inclined faces 11 of the insert piece 7. We then turn the screws 15 into and through the nuts 16, and into engagement with the upper inclined faces 11, thus forcing the nuts 16 outwardly against the upper inclined walls 13 of the offset portions 12, and the inner or lower ends of the screws into engagement with the upper, inclined faces 11 of the insert piece, thus forcing the insert piece down until the upper face of the insert piece is in line with the tread portions of the rails, the small supports of lead 20 yielding as the insert piece is forced down. This being done, molten spelter metal 17 is introduced to the space between the walls of the recess 6 and the hard metal insert piece, and the concavities 14 are filled with asphalt or other comparatively soft material. The spelter metal is prevented from entering the offset portions 12 and the adjacent spaces between the inclined walls 11 by any suitable composition which may be dug out after the introduction of the spelter metal.

When it is desired to reverse the positions of the faces or tread portions of the hard metal insert piece, the asphalt within the concavities 14 is dug out, and the screws 15 removed. Whereupon the nuts 16 will drop into the offset portions 12, thus freeing the hard metal insert piece, which may be then removed, reversed, and replaced within the recess 6. After which, the screws 15 and nuts 16 are brought into position, as previously explained, to clamp the insert piece within the recess.

The upper and lower inclined faces 11 of the insert piece 7 are so positioned with relation to each other and with relation to the upper and lower faces or tread portions of the insert piece, that when the insert piece is placed within the recess with either of its faces in the same horizontal plane with the tread portions of the rails 10, the upper inclined faces 11 of the insert piece will be in proper position to be engaged by the inner lower ends of the screws 15.

Having thus described our invention, we claim as new and desire to secure by Letters Patent:—

1. In a railway frog, a base having a recess in the top thereof, rails having tread portions leading to said base, a reversible hard metal insert piece having upper and lower faces forming tread portions between which are formed flange-receiving grooves, and screws engaging said insert piece and holding it in place, said insert piece being provided with surfaces positioned with relation to the two faces of the insert piece to be engaged by said screws when either face of the insert piece is brought into line with the tread portions of the rails, substantially as described.

2. In a railway frog, a base having a recess in the top thereof, rails having tread portions leading to said base, a reversible hard metal insert piece having upper and lower faces forming tread portions between which are formed flange-receiving grooves, and means engaging said insert piece and holding it in place, said insert piece being provided with oppositely inclined surfaces positioned with relation to the two faces of the insert piece to be engaged by said means when either face of the insert piece is brought into line with the tread portions of the rails, substantially as described.

3. In a railway frog, a base having a recess in the top thereof, rails having tread portions leading to said base, a reversible hard metal insert piece having upper and lower faces forming tread portions between which are formed flange-receiving grooves, and screws engaging said insert piece and holding it in place, said insert piece being provided with oppositely inclined surfaces positioned with relation to the two faces of the insert piece to be engaged by said screws when either face of the insert piece is brought into line with the tread portions of the rails, substantially as described.

4. In a railway frog, a base having a recess in the top thereof, rails having tread portions leading to said base, a reversible hard metal insert piece having upper and lower faces forming tread portions between which are formed flange-receiving grooves, screws engaging said insert piece and holding it in place, said insert piece being provided with surfaces positioned with relation to the two faces of the insert piece to be engaged by said screws when either face of the insert piece is brought into line with the tread portions of the rails, and spelter metal interposed between the hard metal insert piece and the base.

In testimony whereof, we have hereunto affixed our signatures.

CHARLES W. REINOEHL.
BENT L. WEAVER.

Witnesses:
B. A. HANKIN,
WM. R. MILLER.